July 2, 1957  V. F. ZAHODIAKIN  2,797,464
FASTENING DEVICE
Filed April 9, 1953  2 Sheets-Sheet 2
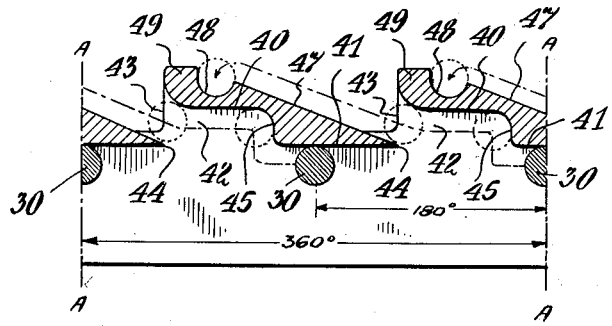
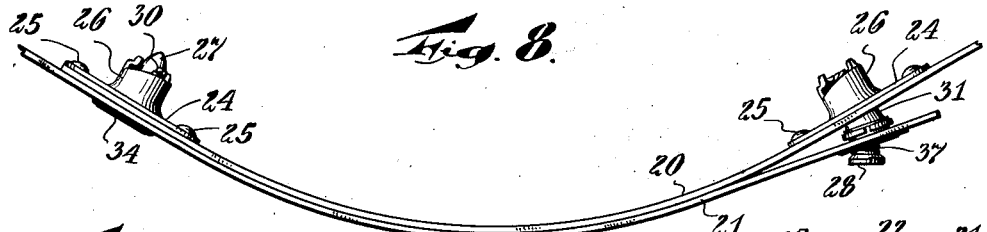
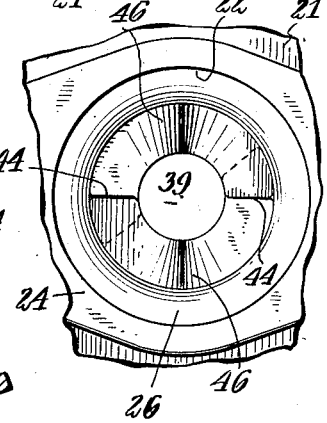
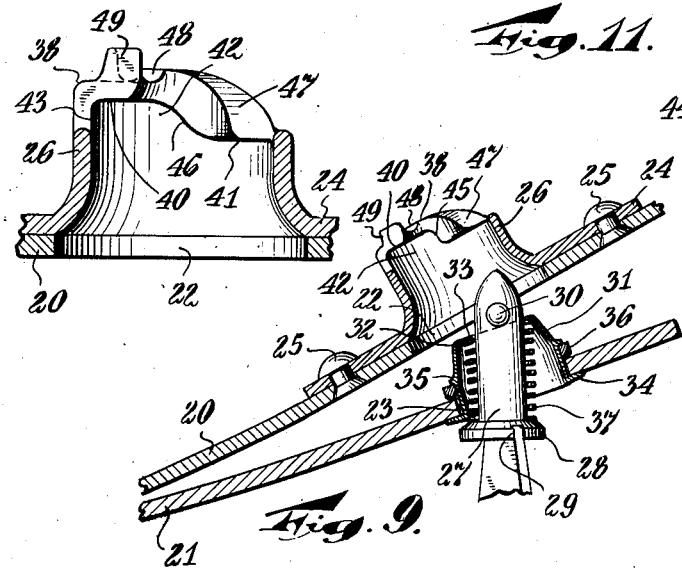
INVENTOR
VICTOR F. ZAHODIAKIN.
BY
Howard P. King
ATTORNEY

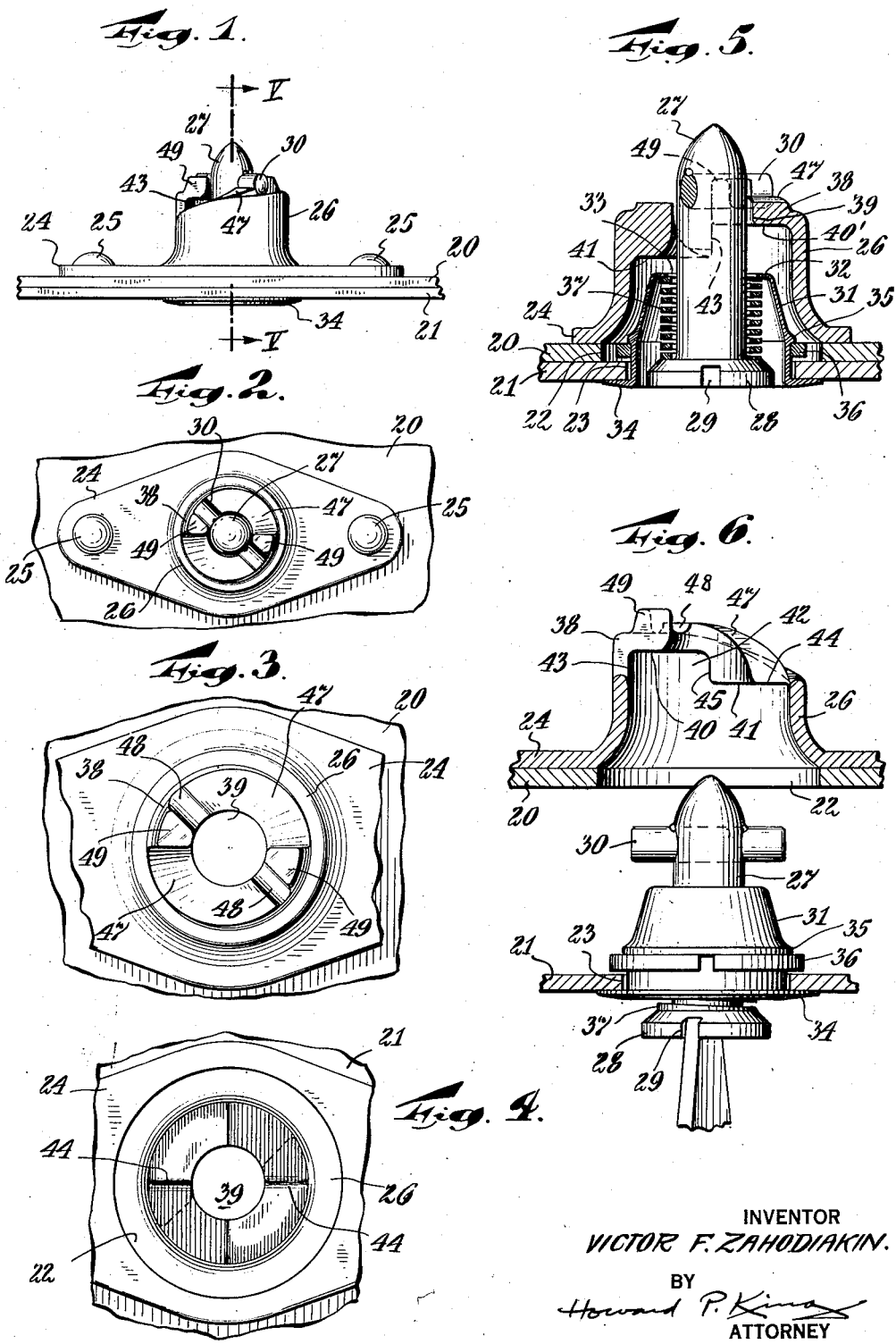

United States Patent Office 2,797,464
Patented July 2, 1957

2,797,464

FASTENING DEVICE

Victor F. Zahodiakin, Summit, N. J.

Application April 9, 1953, Serial No. 347,767

5 Claims. (Cl. 24—221)

This invention relates to a rotary type fastening device such as is commonly employed in aircraft, and in other uses, where a quick-operating fastener is desired or required, and more particularly, has reference to a quick-locking stud and socket type of device wherein an interlock is obtained by engaging the stud with its socket by means of twisting the stud and thereby obtain a compressive clamping of interposed portions of members, such as plates, panels, brackets and other parts which it is desired to secure in juxtaposed position.

The invention contemplates the provision of a rugged structure concentrated in as small a device as possible, and one capable of sustaining very substantial shear stresses as well as axial tensions, and yet one which can be assembled, attached and operated without special tools or skill.

Another object of the invention is to provide a completely assembled stud, spring and retainer as of one unit and therefore not requiring any special tools for assembling the same in the field, but the entire unit can be replaced by another one by simply removing the snap ring and substituting one stud assembly for another.

A general object of the invention is to provide a fastening device of the character above indicated and one which is capable of use with members which approach juxtaposed position from an angular disposition.

Another object of the invention is to provide a stud assembly having a retainer which has a conical formation and which will provide relatively smooth surfaces for applying the snap ring over the retainer without special tools.

Another general object of the invention is to provide a fastening device which visibly indicates at all times whether or not it is locked, and thereby avoids any false impression that the device is locked when in reality it is unlocked.

Another broad concept of the invention is provision of a fastening device wherein the male element assembly is readily removable for substitution or replacement in event of wear, breakage or need for a stud of different length, and proposes accomplishment of this objective without deformation of or injury to the aircraft or other member on which it is mounted.

Corollary to the foregoing, the invention proposes accomplishment of the replacement of the male element asssembly with comparative ease and without requirement of special tools.

An essential object of the invention is to provide a fastening device providing for one-way rotation of the stud element to its locking position, and to include stop means in the path of reverse rotation of the stud element.

A further highly important object of the invention is to provide a long and gradual slope for stud element advancement for purpose of reducing torque and wear and for obtaining maximum axial advancement with minimum application of force to turn the stud element.

Yet another object of the invention is to transfer the lateral stud projection or cross-pin from engagement with the inside end wall or abutment of the socket member to the outer compression sloping surfaces by a rotary actuation of the stud without requiring a distinct longitudinal actuation in making the transition.

Somewhat more specifically, the invention seeks to avoid the conventional double-ended key-hole slot of prior art devices, and in doing so, utilizes ports opening laterally or in a rotational direction of stud.

The contemplated structure and the foregoing objects are influenced by the proposal to obtain a structure having a minimum amount of metal and thereby reduce the weight as much as possible in accomplishment of the expressed purposes.

Other objects and advantages will become evident to persons skilled in the art to which the invention appertains as the description proceeds, both by direct recitation thereof and by implication from the context.

Referring to the accompanying drawings, in which like numerals of reference indicate similar parts throughout the several views:

Figure 1 is an elevation of a fastening device embodying the invention and shown in clamping position;

Figure 2 is a plan of the device as shown in Fig. 1;

Figure 3 is a top view or plan of the socket element;

Figure 4 is an underneath view or bottom plan of said socket element;

Figure 5 is a sectional view on line V—V of Fig. 1;

Figure 6 is a sectional view of the socket element and associated elevation of the stud element showing the respective elements in non-clamping or separated condition;

Figure 7 is a developed view taken on a circular section line next to the inside circumference of the socket element;

Figure 8 is a side elevation of devices applied to curved members showing one device in clamping position and another in open condition;

Figure 9 is a sectional view of the open device of Fig. 8;

Figure 10 is a sectional view of a modified construction of socket element; and

Figure 11 is an underneath view or bottom plan of the modified construction of Fig. 10.

In the specific embodiment of the invention illustrated in said drawings, the reference numerals 20, 21 designate juxtaposed members adapted to be clamped together in overlapped poistion. For convenience in making distinguishing reference thereto, the members will be arbitrarily referred to as inner member 20 and outer member 21. Particular attention has been given to aircraft construction and requirements in the development of the present invention and it may therefore not be amiss to point out that various parts of airplanes, such as wing and fuselage plates, cowls, hoods, brackets and other parts or members are overlapped and secured together. It has become quite common practice to now use some form of stud-and-socket securing means in place of rivets and bolts. The present invention is an improved such means and members 20 and 21 are representative of any number and thickness of bodies to be clamped together. A stud of appropriate length is chosen and used to meet the requirement of superposed thicknesses of bodies being clamped.

The members to be secured are pre-punched with holes 22, 23 respectively which are intended to axially register when the members are assembled, the hole 23 of the outer member, however, being smaller than the hole 22 in the inner member. The socket element of the device is secured, as by means of a face plate 24 constituting an integral part thereof and by rivets 25, to inner member 20. Said socket element has a flared cylinder 26 axially perpendicular to said face plate 24 with the flare directed toward the plate and in substantial registration with the hole 22 of the inner member.

The stud element of the present invention includes a stud 27 the shank of which is tapered or bullet-shape at one end and provided with a head 28 at the other end, said head having a usual kerf 29 for receiving a screwdriver when rotation of the stud is desired. At the bullet-shaped or tapered end portion of said stud is provided a cross-pin 30 constituting a lateral projection from the side of said stud. In the exemplification utilizing a cross-pin, the ends thereof project equally from opposite sides of the stud with an over-all length slightly less than the interior diameter of the smaller end of the flared socket element.

The stud element is mounted in the hole 23 of outer member 21 by means of a retainer 31 which has the general shape of a cup or thimble, except that its end wall 32 is provided with a large opening 33 the diameter of which very considerably exceeds the diameter of the stud shank which passes therethrough. Next to the end of the retainer having the end wall 32, the side wall is sloped or frusto-conical so that the open end of the retainer is of larger diameter than the end having the end wall. Said open end has an outwardly directed flange 34, and back from the flange toward the frusto-conical part of the retainer there is a peripheral bead 35 the outside diameter of which is no greater than the diameter of the hole 23 of member 21 so that the retainer may be inserted through that hole with flange 34 brought up against the margin of the member around the hole. The bead 35 is at appropriate distance from the flange to locate it above the inside face of the said member a correct distance to admit introduction of a split ring 36 between said bead and member around the cylindrical portion of the retainer, thereby securing the retainer in place on the member. The conical taper of the retainer to the bead aids in applying the split ring by sliding it down the tapered surface which expands it to snap past the bead.

Within the retainer and on the stud shank is a coil spring 37 preferably made of rectangular wire, one end of which bears against the stud head and the other end of which bears against the inside of end wall 32 of the retainer. However, the distance of movement of the retainer on the stud away from the stud head is limited by the presence of cross-pin or projection 30 beyond the retainer end wall 32. When the cross-pin is in engagement with said end wall 32 of the retainer, the head of the stud will be projecting from the open end of the retainer and in that position will signify to the mechanic or other interested person that the device is not locked.

Attention is directed to the fact that while the opening 33 in the end wall of the retainer is made as large as practical, it does, nevertheless, leave a margin of metal therearound to be engaged by the spring 37. The frusto-conical shape of the retainer constitutes an exemplification of structure enabling the open end of the retainer to be larger than the other end, so that the stud may tilt at a considerable angle from the axis of the retainer, as shown in Fig. 9. The frusto-conical shape of the retainer, the flared shape of the socket and bullet-shaped end of the stud are all conducive to introduction of the stud element into the socket element when not in axial alignment with each other.

The construction of the socket element is an essential feature of the present invention. Opposite from the flared open end of the socket element at what will be referred to for brevity as the top end of said element, is an end or top wall 38 at the center of which is a circular opening 39 for the stud shank. Devices of the prior art usually have radial slots from the central opening arranged to be open toward the top of the socket element so that a cross-pin may pass from the inside to the outside of the end wall with a movement axially of the socket element as the stud is pushed up through the central opening. I wish to emphasize that such prior art slots are not present in my device.

The under face of the socket element end wall provides two diametrically opposite quadrants 40, 40 at what I will term a high level and two intervening quadrants 41, 41 diametrically opposite each other at a low level. The upper and lower levels are substantially parallel to the flange 34 of the socket and at right angles to the axis of the socket element. Since the lower level quadrants 41 are further within the socket element in a direction toward the bottom open end of said element, the higher level quadrants 42 in the end wall 38. These recesses have a depth represented by the distance separating the planes of the higher and lower level quadrants of the end wall, and that distance is made to be no less than the diameter of the cross-pin 30. Although other arrangements can be made, such as when the depth of the recess 42 is less than the diameter of the cross-pin, a larger radius may be provided at the point of discharge of cross-pin onto the end wall.

In a rotationally forward or clockwise direction, looking in a direction toward the inside of the socket from the flanged open end thereof, at the radial end of the higher level quadrant so as to be at the radial end of the recess, it is a lateral port 43 in a radial plane including the axis, the terminal edge of the high level quadrant constituting the upper edge of that port and the approached radial edge of the low level quadrant constituting the lower edge 44 of said port. The port 43 is, therefore, high enough to permit the pin or projection 30 to be swung through it by rotating the stud. In an opposite rotational direction, the juxtaposed radial terminations of the higher and lower level quadrants is constituted as a radial wall or stop 45 which will prevent backward rotation of the pin and stud as clearly indicated by the developed view of Fig. 7.

The socket element has a smooth or uninterrupted cylindrical bore, and in axial dimension has different lengths due to the presence of the recesses in the end wall of said socket element. Said end wall constitutes a plurality of levels or surfaces parallel to flange 26 of the socket element. The transition from the lower to higher levels as above described is abrupt, forming stops 45. However, it is deemed within the scope of the invention to make the transition less abrupt, and illustrative thereof Figures 10 and 11 show the transition by a reverse or S-curved surface 46 from one level to the other, so that the major portion of the transition is a sloping surface connecting with curving terminations to the respective upper and lower levels thereby providing a smooth riding surface for projection or cross-pin 30 to ride upon. Thus, upon inserting the stud, if the cross-pin lands upon the low level, the rotation of the stud advances the pin onto the S-curved surface 46 and onto the high level without a jump as occurs with abrupt stop 45. The utilization of the reverse curve structure above-described introduces curved junctions to which the upper and lower levels are tangent and thus provides for rotatable forward movement of the cross-pin 30 on the end wall of the socket member without obstruction or sudden change in level. In reverse direction of rotational movement of the cross-pin, the slope 46 functions as a stop to the extent that extra effort would be required on the part of the mechanic to make the cross-pin ride up the slope of the S-curved surface 45.

The top or outer face of top wall 38 of the socket element has pin-advancing slopes or tracks 47 the starting lower ends of which are substantially coincident with the radial edge of approach to the lower level at port 43. The rising slope brings the track 47 to sufficiently high elevation to be above the higher quadrant level, and the slope or track ends with a detaining depression 48 into which the pin will seat upon arrival. During advancement of the cross-pin up tracks 47, compression of spring 37 is obtained. A projecting stop 49 just beyond said depression prevents the pin from over-riding the depression. Location of the recess 42 under the higher end of the slope and under the depression and stop, has the added benefit of economy of metal and of making the device lighter in weight, which is an important consideration with aircraft use.

An outstanding benefit of the construction described above is gained by providing a long and gradual rise in the sloping track 47, made possible by elimination of the usual double keyhole opening for the stud and its pins. The space heretofore required for the slots is utilized in my invention to prolong the slopes or tracks by which the cross-pin is advanced, and thus to attain the same pin rise as heretofore the slope may be much more gradual. By virtue of a more gradual slope, the torque to compress the spring of equal strength as used in the past is considerably less, or, if tighter clamping is desired, a heavier spring may be used and operated with an applied torque corresponding to that of the prior art devices. It may also be emphasized in this connection that the mechanic or other user presses the stud with a screw-driver longitudinally toward the end wall of the socket element simultaneously rotating the stud. Any attempt to rotate the stud backwards quickly brings the cross-pin 30 against the stop 45. Forward rotation causes the upper side of the pin to ride on the horizontal surface of quadrant 40 in recess 42 and in doing so arrives at ports 43 through which it passes by continuing the rotational movement obtaining footing at edge 44 of said opening and without any jump to a new position. The sloping track 47 then becomes effective upon the pin and raises the stud to apply the desired clamping pressure upon members 20, 21.

I claim:

1. A fastener device for juxtaposed members to be clamped, comprising inter-engaging stud and socket elements, said stud having a spring thereon and a one-piece retainer substantially enclosing said spring therein, said retainer having means for securing the same substantially axially perpendicular to one of said juxtaposed members and projecting therefrom, said retainer having a side wall and an end wall directed inwardly from the side wall, said inwardly directed end wall having a hole for the stud larger than said stud providing a clearance therearound at least as great as the thickness of said end wall, and the interior of said retainer side wall progressively increasing in diameter from adjacent said end wall in approach toward the other end of the retainer, and the said interior of the retainer side wall throughout its length having diameters greater than the diameter of said spring so that said spring throughout its length and at both ends thereof is laterally loose in said retainer thereby permitting a large maximum angle of tilting of the stud and spring simultaneously as a unit in said retainer with said retainer remaining secured in its said substantially axially perpendicular position and whereby said stud may be introduced at an angle in a misaligned socket element carried by the other of said juxtaposed members.

2. A fastener device for juxtaposed members to be clamped, comprising an inter-engaging headed stud element and a socket element, said stud having a one-piece retainer thereon, said retainer having an end wall with a large opening therethrough loosely surrounding said stud and having a side wall progressively increasing in diameter longitudinally from said end wall to a diameter greater than the diameter of the stud head, means for securing said retainer fixed to and projecting substantially axially perpendicular outwardly from one of said members, said stud head being at an end of said stud remote from said retainer end wall, and a spring on said stud between said head and retainer end wall, the said progressive increase of diameter of said retainer side wall providing space adapted to entirely receive said spring and stud head therein and within which said stud and spring may tilt and have a maximum tilt substantially entirely between the stud and retainer and with the retainer remaining in its fixed and projecting position on the said one member.

3. A fastener device for juxtaposed members to be clamped, comprising inter-engaging stud and socket elements, said stud having a shank and a one-piece retainer thereon, said retainer having a frusto-conical side wall, a spring on said stud and substantially enclosed by said retainer and stud, said retainer having an end wall at the small end of said frusto-conical wall and projecting inwardly from said side wall toward said stud and said inwardly projecting end wall having an opening larger than the diameter of said stud shank and small enough to prevent passage of said spring therethrough with minimum interference to tilting the stud in said opening, the entire tilt of the stud being with respect to the retainer, and means at the larger end of said retainer for mounting the same to project from and be substantially in fixed and axially perpendicular relation to one of said members.

4. A fastener device for juxtaposed members to be clamped, comprising inter-engaging stud and socket elements, said stud having a shank and a head, a one-piece retainer on said shank, said retainer having a frusto-conical side wall, and a spring on said stud substantially enclosed by said head of the stud and said retainer, said retainer having an end wall projecting inwardly of and at the smaller frusto-conical end of the side wall, said end wall having an opening larger than the diameter of said shank of the stud and small enough to prevent passage of the spring therethrough with minimum interference to tilting the stud in said opening, said retainer having a cylindrical wall at the larger end of said frusto-conical wall, said cylindrical wall having a flange and a bead spaced from the flange, and a split ring on said cylindrical wall of the retainer between said bead and flange for securing the retainer on and projecting from one of said members substantially in fixed and axially perpendicular relation thereto with said end wall thereby held in a plane parallel to said one member.

5. A fastener device for juxtaposed members to be clamped, comprising inter-engaging stud and socket elements, said stud having a shank and a spring thereon and a retainer having a frusto-conical side wall substantially enclosing said spring therein, said retainer having means for securing the same substantially axially fixed and projecting from one of said juxtaposed members perpendicularly therefrom, and said retainer having both ends thereof so loose around said stud that said stud may be tilted in said retainer to have a slope substantially corresponding to the slope of said frusto-conical side wall whereby said stud may be introduced at an angle in a misaligned socket element carried by the other of said juxtaposed members, said shank element having bullet end formation with a substantially pointed end, full maximum tilting of the stud being effected with respect to said retainer extending said pointed end to a tilting range substantially to overlie a side of said retainer and thereby enable said pointed end to engage and slide into a misaligned socket element at sharp angles between said stud and socket element.

References Cited in the file of this patent

UNITED STATES PATENTS

| 2,239,125 | Summers | Apr. 22, 1941 |
| 2,309,732 | Johnson | Feb. 2, 1943 |
| 2,372,496 | Huelster | Mar. 27, 1945 |
| 2,378,122 | Barlow | June 12, 1945 |
| 2,391,288 | Barlow | Dec. 18, 1945 |
| 2,392,718 | Baldwin | Jan. 8, 1946 |
| 2,451,808 | Churchill | Oct. 19, 1948 |
| 2,486,670 | Nigg | Nov. 1, 1949 |
| 2,487,916 | Zahodiakin | Nov. 15, 1949 |
| 2,533,115 | Huelster | Dec. 5, 1950 |
| 2,684,516 | Zahodiakin | July 27, 1954 |

FOREIGN PATENTS

| 544,966 | Great Britain | May 5, 1942 |
| 560,128 | Great Britain | Mar. 21, 1944 |